(12) United States Patent
Sethumadhavan

(10) Patent No.: US 7,931,964 B2
(45) Date of Patent: Apr. 26, 2011

(54) MICROPOROUS LAYERS, AN ARTICLE COMPRISING A MICROPOROUS LAYER, AND A METHOD OF MANUFACTURE THEREOF

(75) Inventor: Murali Sethumadhavan, Acton, MA (US)

(73) Assignee: World Properties, Inc., Lincolnwood, IL (US)

( * ) Notice: Subject to any disclaimer, the term of this patent is extended or adjusted under 35 U.S.C. 154(b) by 336 days.

(21) Appl. No.: 12/100,802

(22) Filed: Apr. 10, 2008

(65) Prior Publication Data

US 2008/0254278 A1 Oct. 16, 2008

Related U.S. Application Data

(60) Provisional application No. 60/910,936, filed on Apr. 10, 2007.

(51) Int. Cl.
*B32B 3/26* (2006.01)
*C08J 9/28* (2006.01)
*H01M 2/14* (2006.01)

(52) U.S. Cl. ............... 428/315.7; 428/315.5; 428/319.3; 428/319.7; 521/64; 521/123; 521/141; 521/142; 429/247

(58) Field of Classification Search ............... 428/315.5, 428/319.3, 319.7; 521/64, 123, 141, 142; 429/247

See application file for complete search history.

(56) References Cited

U.S. PATENT DOCUMENTS

| | | | |
|---|---|---|---|
| 6,153,337 A | 11/2000 | Carlson et al. | |
| 6,186,067 B1 * | 2/2001 | Rorke et al. | 101/467 |
| 6,306,545 B1 | 10/2001 | Carlson et al. | |
| 6,497,780 B1 | 12/2002 | Carlson | |
| 7,081,142 B1 * | 7/2006 | Carlson | 29/623.5 |
| 2006/0216584 A1 * | 9/2006 | Cheiky | 429/144 |
| 2008/0199781 A1 * | 8/2008 | Lunt et al. | 429/246 |

FOREIGN PATENT DOCUMENTS

WO    WO 0139294 A2  *  5/2001

* cited by examiner

*Primary Examiner* — Hai Vo
(74) *Attorney, Agent, or Firm* — Cantor Colburn LLP

(57) ABSTRACT

A microporous layer comprising a microporous xerogel comprising pores that are substantially continuously interconnected from a first outermost surface of the microporous xerogel through to a second outermost surface of the microporous xerogel; and a crosslinked polymer binder comprising a polymer having a glass transition temperature of about 50° C. or higher, wherein the polymer binder is water soluble prior to crosslinking.

14 Claims, No Drawings

MICROPOROUS LAYERS, AN ARTICLE COMPRISING A MICROPOROUS LAYER, AND A METHOD OF MANUFACTURE THEREOF

BACKGROUND

This disclosure relates to microporous layers, an article comprising a microporous layer, and a method of manufacture thereof.

There are a variety of applications where microporous layers, for example, layers having pores having an average diameter of less than about 1 micrometer, would be useful. In many of these applications it would be desirable for the microporous layers to have high glass transition temperatures (Tg), on the order of greater than about 50° C., and to be chemically resistant. However, commercially available polymers that could be used to manufacture microporous materials have relatively low glass transition temperatures. Certain commercially available sol-gel materials have higher glass transition temperatures, but the glass transition temperatures are reduced when films made from the sol gels are exposed to chemicals such as water and/or electrolytes.

Accordingly there remains a need in the art for microporous layer that has a high glass transition temperature that is maintained in the presence of chemicals such as water and/or electrolytes.

SUMMARY

The above-described drawbacks and disadvantages are alleviated by a microporous layer comprising a microporous xerogel and a crosslinked polymer binder having a glass transition temperature of about 50° C. or higher, wherein the polymer binder is water soluble prior to crosslinking. Preferably, the glass transition temperature of the polymer is not substantially affected by the presence of water and/or electrolytes.

Also disclosed herein is a microporous layer comprising a microporous xerogel comprising pores that are substantially continuously interconnected from a first outermost surface of the microporous xerogel through to a second outermost surface of the microporous xerogel; and a crosslinked polymer binder comprising a polymer having a glass transition temperature of about 50° C. or higher, wherein the polymer binder is water soluble prior to crosslinking.

Further disclosed herein is an article comprising the above-described microporous layer. In one embodiment, the microporous layer is infused with an organic electrolyte to provide a battery separator.

Disclosed herein too is a method of manufacture of a microporous layer comprising a microporous xerogel, the method comprising disposing onto a substrate a xerogel-forming composition comprising a sol, a binder comprising a crosslinked polymer having a glass transition temperature that is greater than or equal to about 50° C., wherein the polymer binder is water soluble prior to crosslinking, and a liquid medium; removing the liquid medium from the xerogel-forming composition to form a microporous xerogel comprising pores that are substantially continuously interconnected from a first outermost surface of the microporous xerogel through to a second outermost surface of the microporous xerogel; contacting a surface of the microporous xerogel with an organic electrolyte; and infusing the organic electrolyte into pores of the microporous layer.

Disclosed herein too is a method of manufacture of a microporous layer comprising a microporous xerogel, the method comprising disposing onto a temporary carrier a xerogel-forming composition comprising a sol, a binder comprising a crosslinked polymer having a glass transition temperature that is greater than or equal to about 50° C., wherein the polymer binder is water soluble prior to crosslinking, and a liquid medium; removing the liquid medium from the xerogel-forming composition to form the microporous xerogel comprising pores that are substantially continuously interconnected from a first outermost surface of the microporous xerogel through to a second outermost surface of the microporous xerogel, wherein the microporous xerogel has a first surface on a side adjacent to the temporary carrier and has a second surface on a side opposite the temporary carrier; laminating the second surface of the microporous xerogel to a substrate; and removing the temporary carrier.

DETAILED DESCRIPTION

It has been discovered by the inventors hereof that use of a high Tg polymer binder provides microporous xerogels with improved thermal and chemical resistance. The binders are formed from crosslinkable polymer systems that are water soluble. Preferably, the glass transition temperature of the crosslinked polymer binder is not substantially affected by exposure to chemicals, for example water and electrolytes. The microporous xerogels are useful in a wide variety of applications, such as separators in electrochemical cells including lithium ion batteries, fuel cells, in ink jet ink-receptive media, as filtration materials, for example in water treatment or bio-filtration, and other product applications.

A xerogel as used herein means a material comprising a solid gel matrix formed by removing liquid from a xerogel-forming composition. The xerogel-forming composition comprises an inorganic material that may be use in the form of a sol, a polymeric binder, and a liquid medium. Other additives may optionally be present. In one embodiment, the xerogel-forming composition is a sol-gel composition.

Suitable inorganic materials for forming a sol include metal alkoxides, for example aluminum, tin, zirconium, barium, titanium, or silicon alkoxide, and the like. Aluminum alkoxides may be used to form "pseudo-boehmite" xerogels, which are hydrated aluminum oxides having the chemical formula $Al_2O_3 \cdot xH_2O$ wherein x is 1.0 to 1.5. Pseudo-boehmites are distinct from anhydrous aluminas ($Al_2O_3$, such as alpha-alumina and gamma-alumina), and hydrated aluminum oxides of the formula $Al_2O_3 \cdot xH_2O$ wherein x is less than 1.0 or greater than 1.5. In one embodiment, the inorganic material comprises a colloid (a sol) having, for example, an average colloidal particle size of less than or equal to about 2 micrometers, specifically less than or equal to about 1 micrometer, and more specifically less than or equal to about 500 nanometers. Exemplary colloidal materials include colloidal silicas, colloidal non-hydrated aluminum oxides, colloidal tin oxides, colloidal titanium oxides, colloidal zirconium oxides, and colloidal zinc oxides.

The xerogel-forming composition further comprises a crosslinkable polymeric binder that, after crosslinking, has a Tg of about 50° C. or greater, specifically about 50° C. to about 200° C., and more specifically about 75° C. to about 150° C. Preferably, the Tg of the crosslinked polymer is not substantially affected by the presence of water, electrolytes, or other additives present in the final application. In one embodiment, after exposure to an additive, the glass transition temperature of the polymer is reduced by about 25% or less, specifically about 10% or less, and more specifically about 5% or less.

The crosslinkable polymeric binder is further water soluble, in particular soluble in the aqueous liquid medium used to form the microporous xerogel as described in further detail below.

A variety of polymers may accordingly be used as the crosslinkable polymeric binder, provided that the polymer meets the above Tg and solubility characteristics. Suitable polymers include, for example, homopolymers and copolymers derived from the polymerization of vinyl acetate, vinyl alcohol, ethylene oxide, maleic anhydride and derivatives and esters thereof. Exemplary polymers include polyvinyl alcohol (PVA), polyethyleneoxide, alkylated polyethylene oxide, polyvinyl pyrrolidone, polyvinyl butyral (PVB), polyacrylamide, polyvinyl ethers, polyethyleneimines, polyepoxy resins, and the like. Other suitable binders include melamine formaldehydes, urea formaldehydes, gelatin, starch, and copolymers of cellulosics. Combinations comprising at least one of the foregoing polymers may be used. Specific exemplary polymers include polyvinyl acetate, polyvinylcohol, polyethylene oxide, polyvinyl pyrrolidone, copolymers of the foregoing, or a combination comprising at least one of the foregoing polymers.

In one embodiment, the crosslinkable polymeric binder comprises a cured PVA or PVB resin, in particular a phenolic-cured resin, or a resin cured with melamine formaldehyde or urea formaldehyde. The amount of crosslinking agent in the polymer, for example in the PVA or PVB resin, may be about 20 to about 80 mole percent, specifically about 40 to about 60 mole percent, particularly when using melamine formaldehyde or urea formaldehyde.

The relative amount of sol and crosslinkable polymeric binder will depend on the particular sol and binders used and the desired properties of the microporous xerogel, and may be readily determined by one of ordinary skill in the art without undue experimentation. In one embodiment, the crosslinkable polymeric binder is present in an amount of 3 to 200% by weight of the sol, specifically 5 to 70% by weight of the sol in the xerogel-forming composition.

The xerogel-forming composition may further comprise an additive, for example a pigment, crosslinking agent, catalyst for non-radiation curing, sensitizer for radiation curing, plasticizer, surfactant, an inorganic binder, or a combination comprising at least one of the foregoing additives. In one embodiment, the inorganic binder comprises a colloidal material having, for example, an average colloidal particle size of less than or equal to about 2 micrometers, specifically less than or equal to about 1 micrometer, and more specifically less than or equal to about 500 nanometers. Exemplary colloidal materials include colloidal silicas, colloidal non-hydrated aluminum oxides, colloidal tin oxides, colloidal titanium oxides, colloidal zirconium oxides, and colloidal zinc oxides.

The liquid medium in the xerogel-forming composition comprises water and optionally a protic organic solvent. The choice of liquid medium depends on several factors including compatibility with the sol and binder in the xerogel-forming composition. Exemplary protic organic solvents include methanol, ethanol, isopropanol, 1-propanol, 1-butanol, 2-butanol, ethylene glycol, propylene glycol, 2-methoxyethanol, 2-ethoxyethanol, and 2-butoxyethanol. Other alcohols and glycols, or a combination comprising at least one of the foregoing alcohols and glycols may be used. A specific organic solvent is ethanol. Small amounts, e.g., up to 5 volume percent of other organic solvents may be present for example various ketones, esters, hydrocarbons, or a combination comprising at least one of the foregoing organic solvents.

A method of manufacture of a microporous xerogel layer comprises forming the xerogel-forming composition in an aqueous liquid medium as described above; forming a layer of the mixture; and removing the liquid medium to form the microporous xerogel layer.

The xerogel-forming composition may have any solids content that is consistent with a viscosity and rheology that is acceptable in the coating method and that forms the desired layer thickness. In general, the xerogel-forming composition comprises about 10 to about 30 percent solids, specifically about 14 to about 20 percent solids.

The xerogel-forming composition may be applied to a substrate or to a temporary carrier or other layer by coating methods such as wire-wound rod coating, spray coating, spin coating, reverse roll coating, gravure coating, slot extrusion coating, gap blade coating, and dip coating.

After the xerogel-forming composition is formed into a layer, the liquid medium is substantially removed to provide a dried, microporous xerogel layer. Removal of the liquid medium may be accomplished by a suitable drying process, such as blowing hot air over the layer at a high velocity, or exposure of the layer to ambient air conditions. As the liquid is removed from the formed xerogel-forming composition by, for example, evaporation, large capillary forces are exerted on the pores, forming a microporous xerogel layer.

The microporous xerogel comprises a dried microporous three-dimensional solid gel network with pores that are substantially continuously interconnected from one outermost surface of the xerogel through to an opposite outermost surface of the xerogel. The pores are defined by substantially continuous material comprising the xerogel, binder, and any other additives. Thus, the materials of the xerogel are in contact and do not have discontinuities in the structure, which distinguishes the xerogels from layers of discontinuous solid particles that are separated from each other.

The microporous xerogel may be characterized using a variety of parameters, including average pore diameter, size of particulates that may pass through the pores, pore volume, and the like.

In one embodiment, the pores of the microporous xerogel have an average pore diameter of about 1 nanometer to about 1,000 nanometers, specifically about 100 to about 900 nanometers, more specifically about 200 to about 800 nanometers, even more specifically about 300 to about 700 nanometers. In another embodiment, the xerogel has average pore diameters of about 1 to about 300 nanometers, specifically about 2 to about 100 nanometers, more specifically about 3 to about 50 nanometers, and even more specifically about 4 to about 10 nanometers. An exemplary average pore diameter is about 40 nanometers.

Alternatively, or in addition, the microporous xerogel has a thickness and an average pore diameter that is small enough to prevent the diffusion of insoluble and/or colloidal particles such as carbon or metal powder. This would prevent short circuiting of lithium ion batteries. In one embodiment, the microporous xerogel layer has a thickness and an average pore diameter that is small enough to prevent the diffusion of insoluble and/or colloidal particles having average diameters about 500 nanometers or greater, specifically about 750 nanometers or greater, and more specifically about 1 micrometer or greater.

Alternatively, or in addition, the microporous xerogel has an average pore diameter that is small enough to selectively inhibit the diffusion of soluble materials having molecular weights above a certain cut-off molecular weight while permitting the diffusion of soluble materials with molecular weights below this cutoff level. In one embodiment, the microporous xerogel has an average pore diameter that is small enough to selectively inhibit the diffusion of soluble materials having a molecular weight of greater than or equal to about 2,000, specifically greater than or equal to about 5,000, and more specifically greater than or equal to about 10,000.

Alternatively, or in addition, the microporous xerogel has an average pore diameter that is small enough to provide strong capillary action which enhances the capability of the microporous xerogel to readily take up or imbibe liquids, such as electrolyte liquids and ink jet ink liquids, and to retain these liquids in pores within the microporous xerogel.

The amount of the pores in a microporous xerogel may be characterized by the pore volume, which is the volume in cubic centimeters of pores per unit weight of the microporous xerogel. In one embodiment, the microporous xerogel has a pore volume of about 0.02 to about 2.0 $cm^3/g$, specifically about 0.3 to 1.0 $cm^3/g$, more specifically about 0.4 to 0.7 $cm^3/g$. The pore volume may be measured by filling the pores with a liquid having a known density and then calculated by the increase in weight of the microporous xerogel with the liquid present divided by the known density of the liquid and then dividing this quotient by the weight of the microporous xerogel with no liquid present, according to the equation:

$$\text{Pore Volume} = \frac{[W_1 - W_2]/d}{W_2} \quad 1$$

where $W_1$ is the weight of the microporous xerogel when the pores are completely filled with the liquid of known density, $W_2$ is the weight of the microporous xerogel with no liquid present in the pores, and d is the density of the liquid used to fill the pores. Also, the pore volume may be estimated from the apparent density of the microporous xerogel by subtracting the reciprocal of the theoretical density of the materials (assuming no pores) comprising the microporous layer from the reciprocal of the apparent density or measured density of the actual microporous layer, according to the equation:

$$\text{Pore Volume} = \left(\frac{1}{d_1} - \frac{1}{d_2}\right) \quad 2$$

where $d_1$ is the density of the layer which is determined from the quotient of the weight of the microporous xerogel and the microporous xerogel volume as determined from the measurements of the dimensions of the microporous xerogel, and $d_2$ is the calculated density of the materials in the microporous xerogel assuming no pores are present or, in other words, $d_2$ is the density of the solid part of the microporous xerogel as calculated from the densities and the relative amounts of the different materials in the microporous xerogel. The porosity or void volume of the microporous xerogel, expressed as percent by volume, may be determined according to the equation:

$$\text{Porosity} = \frac{100(PoreVolume)}{(PoreVolume + 1/d_2)} \quad 3$$

where pore volume is as determined above, and $d_2$ is the calculated density of the solid part of the microporous xerogel, as described above. In one embodiment, the microporous xerogel has a porosity of about 20% to about 80%, specifically about 30% to about 70%, and more specifically about 40% to about 60%. An exemplary porosity is about 50%.

In one embodiment, the microporous xerogel has a thickness of about 1 micrometer to about 50 micrometers, specifically about 2 micrometers to about 25 micrometers, and, more specifically, about 3 micrometers to about 15 micrometers.

In one embodiment, the microporous layer is used in a separator membrane layer in an electrolyte element in an electrochemical cell, more specifically a lithium battery, wherein the electrolyte element comprises the separator layer and an aqueous or non-aqueous electrolyte in the pores of the separator layer. The term "electrochemical cell," as used herein, refers to an article that produces an electric current by an electrochemical reaction and that further comprises a positive electrode or cathode, a negative electrode or anode. The electrolyte element is interposed between the anode and the cathode, wherein the electrolyte element comprises the separator layer and an aqueous or non-aqueous electrolyte in pores of the separator layer. Electrochemical cells may be primary or secondary cells.

Suitable electrolytes are liquid electrolytes, gel polymer electrolytes, and solid polymer electrolytes. The electrolytes comprise an ionic electrolyte salt.

The liquid electrolyte solvent comprises an appropriate ionic electrolyte salt and an electrolyte solvent. Suitable electrolyte solvents include, for example, methylene carbonate, ethylene carbonate, methylene ethylene carbonate, or combinations thereof. The electrolyte solvents of the liquid electrolytes are also useful as plasticizers for semi-solid or gel polymer electrolytes. The semi-solid or gel polymer electrolyte comprises an appropriate ionic electrolyte salt, an electrolyte solvent that provides a semi-solid or gel state, and an ionic conductive polymer. The solid polymer electrolyte comprises an appropriate ionic electrolyte salt and an ionic conductive polymer. The solid polymer electrolyte may further comprise an electrolyte solvent. In one embodiment, the electrolyte solvent is present at less than about 30% by weight of the solid polymer electrolyte, specifically less than about 20% by weight, and more specifically less than about 10% by weight. Suitable ionic conductive polymers for use in the gel polymer and solid polymer electrolytes include, for example, polyethylene oxides (PEO), polypropylene oxides, polyacrylonitriles (PAN), polysiloxanes, polyimides, polyphosphazenes, polyethers, sulfonated polyimides, perfluorinated membranes (for example, NAFION® resins), polydivinyl polyethylene glycols, polyethylene glycol diacrylates, polyethylene glycol dimethacrylates, derivatives of the foregoing, copolymers of the foregoing, crosslinked and network structures of the foregoing, or blends of the foregoing.

In one embodiment, the organic electrolyte comprises an ionic electrolyte salt to improve the ionic conductivity and other electrochemical properties of the electrolyte element. Suitable examples of ionic electrolyte salts include $MClO_4$, $MAsF_6$, $MSO_3CF_3$, $MSO_3CH_3$, $MBF_4$, $MB(Ph)_4$, $MPF_6$, MSCN, MIMBr,

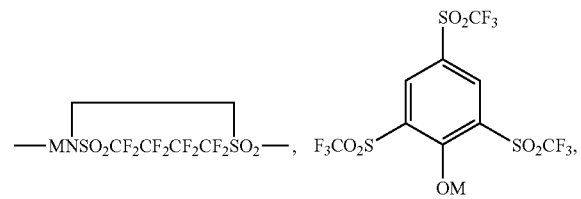

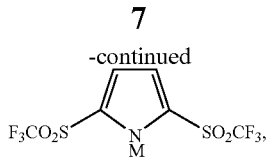

and the like, or a combination comprising at least one of the foregoing ionic electrolyte salts, where M is Li or Na. Other suitable electrolyte salts include, for example, lithium polysulfides and lithium salts of organic ionic polysulfides. Exemplary ionic electrolyte salts are LiI, LiSCN, LiSO$_3$CF$_3$ (lithium triflate), and LiN(SO$_2$CF$_3$)$_2$ (lithium imide), or a combination comprising at least one of the foregoing ionic electrolyte salts.

Disclosed herein too is method of manufacture of an article comprising: coating a microporous layer on a temporary carrier to provide a microporous layer assembly; coating a layer in a coating pattern on a surface of the microporous layer on a side opposite from the temporary carrier; laminating the microporous layer assembly to a substrate; and removing the temporary carrier from the microporous layer. In one embodiment, the temporary carrier functions as a temporary support to the superposed layers during assembly of the microporous layer and may be any web or sheet material possessing suitable smoothness, flexibility, dimensional stability, and adherence properties in the microporous layer assembly. In one embodiment, the temporary carrier is a flexible web substrate. Suitable web substrates include, for example, papers, polymeric films, and metals. An exemplary flexible polymeric film is a polyethylene terephthalate film. In one embodiment, the flexible web substrate is surface treated with a release agent to enhance release characteristics of the flexible web substrate, such as by treatment with a silicone release agent. Examples of suitable flexible web substrates include, for example, resin-coated papers such as papers on which a polymer of an olefin containing 2 to 10 carbon atoms, such as polyethylene, is coated or laminated; and transparent or opaque polymeric films such as polyesters, polypropylene, polystyrene, polycarbonates, polyvinyl chloride, polyvinyl fluoride, polyacrylates, and cellulose acetate. In one embodiment, the temporary carrier has a thickness of about 1 micrometer to about 200 micrometers, specifically about 2 micrometers to about 100 micrometers, and more specifically about 5 micrometers to about 50 micrometers. In one embodiment, the temporary carrier, after its removal from the microporous layer assembly, may be reused for preparing another article, may be reused for a different product application, or may be reclaimed and recycled.

Specifically disclosed herein is a method of manufacture of a separator membrane for lithium batteries comprising coating at least one layer of xerogel-forming composition comprising an inorganic material, a liquid medium, and a crosslinkable polymeric binder on a temporary carrier substrate, removing the liquid medium from the at least one layer of xerogel-forming composition to provide a separator membrane layer comprising a crosslinked polymeric binder, and removing the temporary carrier from the separator membrane layer. In one embodiment, the temporary carrier may be any web or sheet material possessing suitable smoothness, flexibility, dimensional stability, and adherence properties as a substrate for the separator membrane.

The microporous layer assembly comprises a microporous xerogel layer. In one embodiment, the microporous layer assembly further comprises a non-microporous coating layer, wherein the non-microporous coating layer is in contact with the microporous xerogel layer. In one embodiment, the microporous xerogel layer is coated directly on the temporary carrier. In one embodiment, the non-microporous coating layer is coated directly on the temporary carrier.

The non-microporous coating layer may enhance the mechanical strength and add flexibility to the microporous layer assembly. The non-microporous coating layer may also provide specific functional properties to the article, such as adhesion to the substrate, ability to absorb specific liquids, and specific gloss, opacity, and other optical properties. The thickness of the non-microporous coating layer is about 0.1 micrometer to about 200 micrometers, specifically about 0.2 micrometers to about 100 micrometers, and more specifically about 0.5 micrometers to about 50 micrometers.

The non-microporous coating layer may further comprise a polymer, pigment, and other coating materials such as, for example, photosensitizers for radiation curing; catalysts for non-radiation curing; crosslinking agents such as zirconium compounds, aziridines, and isocyanates; surfactants; plasticizers; dispersants; flow control additives; and rheology modifiers.

The microporous layer assembly may comprise a plurality of microporous layers and/or non-microporous coating layers. The composition may be the same or different for each such layer in the microporous layer assembly. In one embodiment, two microporous layers are adjacent to one another in the microporous layer assembly. In one embodiment, two non-microporous coating layers are adjacent to one another in the microporous layer assembly. In one embodiment, a non-microporous coating layer is intermediate between two microporous layers. In one embodiment, a microporous layer is intermediate between two non-microporous coating layers.

The microporous layer assembly may be included in a wide variety of articles including, for example, electrochemical cells, capacitors, fuel cells, ink jet printing and other imaging media, and filtration media. In the case of electric current producing articles such as electrochemical cells, capacitors, and fuel cells, which have two electrodes and a microporous separator or membrane layer interposed between the two electrodes, the microporous layer assembly may be a first electrode/separator assembly, the substrate may be a second electrode assembly such as a second electrode on a second temporary carrier, and the article may be the electrochemical cell, capacitor, or fuel cell depending on the specific electrodes, separator, and other components utilized.

In one embodiment, the microporous layer assembly is a separator assembly, the substrate is a first electrode assembly such as a cathode assembly or an anode assembly, and the article is a first electrode/separator assembly such as a cathode/separator assembly. An electrode-separator assembly for a lithium battery comprises a first layer comprising a first electrode material, and a second layer disposed thereon comprising the disclosed separator membrane layer. The separator membrane layer comprises at least one layer of a microporous xerogel. The electrode-separator assembly may further comprise a third layer comprising a second electrode material disposed on opposite side of the separator membrane layer. The electrode layers are the anode and cathode of a lithium battery.

For ink jet printing media, the microporous layer assembly may be an ink jet ink-receptive coating assembly, such as a single or multiple coating layer design comprising a microporous layer, the substrate may be a flexible web substrate such as cloth, canvas, paper, and non-woven plastics, and the article is an ink jet printing media.

For filtration media, the microporous layer assembly may be an ultrafiltration layer assembly such as a single or multiple coating layer design comprising a microporous layer, the substrate may be a flexible web substrate such as a paper, and the article is a filtration media. In one embodiment, an ultrafiltration layer of a microporous xerogel layer is disposed adjacent to the paper surface by lamination to the rough surface of the paper. Optionally, the coarser filtration layer of the microporous xerogel layer is on a side of the microporous xerogel layer opposite to the paper.

Several embodiments are described in the following examples, which are offered by way of illustration and not by way of limitation.

EXAMPLES

Various polymers were tested as a polymeric binder in a microporous xerogel in a separator layer in an electrochemical cell containing organic carbonates as the electrolyte. A homopolymer of poly(vinyl alcohol) (PVA) having an average molecular weight of about 146,000 to 186,000 g/mol, a homopolymer of poly(vinyl pyrrolidone) (PVP) having an average molecular weight of about 74,000 to about 92,000 g/mol, and a copolymer of PVA and PVP.

Example 1

PVA

A microporous pseudo-boehmite xerogel with PVA binder present is prepared according to the following procedure. A coating mixture with a solids content of about 5 to about 9.5 percent comprising about 5 to about 10 weight percent (solid content) of a boehmite sol (available as CATALOID AS-3 from Catalysts & Chemicals Ind. Co., Ltd., Tokyo, Japan) and 0.5 to 1 weight percent (solid content) of PVA polymer having an average molecular weight of 146,000 to 186,000 water is prepared. Suitable crosslinkers effective at curing the PVA, selected from aldehydes, thermosetting resins, salts of multivalent anions, and the like, such as SUNREZ 700 resins obtained from Sequa Corporation, BACOTE-20 obtained from Hopton Technology, or POLYCUP 172, obtained from Hercules Incorporated, are added. This coating mixture is coated on 100 micrometer thick polyethylene terephthalate (PET) film (available as MELINEX 516 film from ICI Polyester, Wilmington, Del.) using a gap coater so that the dry pseudo-boehmite microporous xerogel thickness would be 25 micrometers and followed by drying at 130° C. Alternatively, the dry coating thickness of 25 micrometers is obtained by multiple passes of coating application and drying such as two consecutive coating applications with thicknesses of about 12.5 micrometers of dry coating. After drying, the 25 micrometer pseudo-boehmite coating is delaminated from the PET film substrate. The curing of the PVA is effected during the drying cycle or by heating from 50° C. to 200° C.

The pore volume of this 25 micrometer free standing pseudo-boehmite microporous xerogel is determined by soaking a piece of the microporous xerogel with a known area in liquid polyethylene glycol dimethyl ether, wiping the excess liquid from the film surface, and weighing the film before and after imbibing the liquid. By this method, using Equation 1, the pore volume of the 25 micrometer pseudo-boehmite microporous xerogel is measured to be about 0.55 to about 0.75 cm$^3$/g. The porosity is calculated as 50 to 75% using Equation 3. Using the same method, the porosity of CELGARD 2500 polyethylene separator film (available from Hoechst Celanese Corporation, Charlotte, N.C.) is calculated as 48%.

Example 2

PVP

A 25 micrometer thick free-standing pseudo-boehmite microporous xerogel is prepared according to Prospective Example 1 by combining in water a boehmite sol and a PVP homopolymer having an average molecular weight between 74,000 and 92,000 g/mol (available from BASF under the trade name Luvitec K, with K ranging between 80 and 90). The microporous xerogel is then dried at 25° C. in a laboratory hood with moderate exhaust air flow. The dried microporous xerogel is then cured by placing it on the conveyor belt of a radiation curing apparatus (available as FUSION Model P300 UV exposure unit from Fusion Systems Company, Torrance, Calif.) and exposing it to the UV lamps for 30 seconds. The resulting 25 micrometer thick pseudo-boehmite separator microporous xerogel with polymer treatment is insoluble in water. The void volume of the pseudo-boehmite microporous xerogel remaining after this polymer treatment is calculated to be about 50% to about 75% as described above.

Example 3

PVP

A 25-micrometer thick free-standing pseudo-boehmite microporous xerogel is prepared according to Prospective Example 1 by combining in water a boehmite sol, a PVA homopolymer having an average molecular weight o of 146,000 to 186,000, and a PVP homopolymer having an average molecular weight between 74,000 and 92,000 g/mol. Crosslinkers effective at crosslinking the PVA such as Sunrez 700 resins, BACPTE-20, or POLYCUP 172, are added. The microporous xerogel is then dried at 130° C. to effect drying and the crosslinking of the PVA. Alternatively, the microporous xerogel is dried at 30° C. in a laboratory hood with moderate exhaust air flow and the curing of the PVA is effected by heating the microporous xerogel to 50° C. to 200° C. The PVP of the dried microporous xerogel is then cured by placing it on the conveyor belt of a radiation curing apparatus (available as FUSION Model P300 UV exposure unit from Fusion Systems Company, Torrance, Calif.) and exposing it to the UV lamps for 30 seconds. The resulting 25 micrometer thick pseudo-boehmite separator microporous xerogel with polymer treatment is insoluble in water. The void volume of the pseudo-boehmite microporous xerogel remaining after this polymer treatment is calculated to be about 50% to about 75% as described above.

The microporous xerogel layer disclosed herein advantageously possesses a high glass transition temperature and is chemically resistant. The microporous xerogel layer may be used in a wide variety of applications, such as separators for use in electrochemical cells, ink jet ink-receptive media, filtration materials, and other product applications.

The terms "a" and "an" do not denote a limitation of quantity, but rather denote the presence of at least one of the referenced item. Unless defined otherwise, technical and scientific terms used herein have the same meaning as is commonly understood by one of skill in the art to which this invention belongs. The modifier "about" used in connection with a quantity is inclusive of the stated value and has the meaning dictated by the context (e.g., includes the degree of error associated with measurement of the particular quantity). The endpoints of all ranges directed to the same component or property are inclusive of the endpoint and independently combinable. As used herein, "combination" is inclusive of blends, mixtures, alloys, reaction products, and the like.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A microporous layer comprising a microporous xerogel comprising pores that are substantially continuously interconnected from a first outermost surface of the microporous xerogel through to a second outermost surface of the microporous xerogel; and
   a crosslinked polymer binder comprising a polymer and a crosslinking agent, the crosslinked polymer binder having a glass transition temperature of about 50° C. or higher, wherein the polymer binder is water soluble prior to crosslinking;
   wherein the crosslinking agent comprises an aldehyde or thermosetting polymer and wherein the crosslinking agent in the polymer is present in an amount of about 40 to about 80 mole percent;
   wherein the crosslinked polymer binder is present in an amount of 5 to 70 wt. % by weight of the sol in the xerogel-forming composition and wherein the xerogel-forming composition comprises about 10 to 30 percent solids;
   wherein the microporous xerogel comprises a pseudo-boehmite, zirconium oxide, titanium oxide, barium oxide, silicon oxide, aluminum oxide, tin oxide, or a combination comprising at least one of the foregoing oxides;
   wherein the polymer is a polyvinyl alcohol, a copolymer of a polyvinyl acetate and a polyvinyl pyrrolidone, a copolymer of polyvinyl alcohol and a polyvinyl pyrrolidone, or a combinations comprising at least one of the foregoing polymers;
   wherein the glass transition temperature of the polymer changes by less than about 25% after exposure to water; and
   wherein the microporous xerogel has a porosity of 40 to 80%.

2. The microporous layer of claim 1, wherein the glass transition temperature of the polymer changes by less than about 25% after exposure to an organic electrolyte.

3. The microporous layer of claim 1, wherein the polymer that, after crosslinking, has a glass transition temperature of about 50° C. or higher is a polyvinyl alcohol crosslinked with melamine formaldehyde or urea formaldehyde.

4. The microporous layer of claim 1, further comprising an additive selected from the group consisting of pigments, catalysts for non-radiation curing, sensitizers for radiation curing, plasticizers, surfactants, dispersants, and combinations of at least one of the foregoing additives.

5. The microporous layer of claim 1 further comprising a non-microporous coating layer, wherein the non-microporous coating layer comprises a surface that is in contact with a surface of the microporous layer.

6. An article comprising the microporous layer of claim 1.

7. The microporous layer of claim 1, wherein the microporous xerogel has an average pore size of 1 to 300 nanometers.

8. The microporous layer of claim 1, wherein the microporous xerogel has a porosity of 50% to 80%.

9. The microporous layer of claim 1, wherein said transition glass temperature is 75 to 150° C.

10. The microporous layer of claim 1, wherein the xerogel-forming composition comprises 14 to 20 percent solids.

11. A microporous layer comprising a microporous xerogel comprising pores that are substantially continuously interconnected from a first outermost surface of the microporous xerogel through to a second outermost surface of the microporous xerogel; and
    a crosslinked polymer binder comprising a polymer and a crosslinking agent, the crosslinked polymer binder having a glass transition temperature of about 50° C. or higher, wherein the polymer binder is water soluble prior to crosslinking;
    wherein the crosslinking agent comprises melamine formaldehyde or urea formaldehyde and wherein the crosslinking agent in the polymer is present in an amount of about 40 to about 60 mole percent;
    wherein the crosslinked polymer binder is present in an amount of 5 to 70 wt. % by weight of the sol in the xerogel-forming composition and wherein the xerogel-forming composition comprises about 10 to 30 percent solids;
    wherein the microporous xerogel comprises 5 to 10 wt. % of a pseudo-boehmite;
    wherein the polymer is a polyvinyl alcohol, a copolymer of a polyvinyl acetate and a polyvinyl pyrrolidone, a copolymer of polyvinyl alcohol and a polyvinyl pyrrolidone, or a combination comprising at least one of the foregoing polymers;
    wherein the glass transition temperature of the polymer changes by less than about 10% after exposure to water; and
    wherein the microporous xerogel has a porosity of 40 to 80%.

12. An article made by a method of manufacture comprising:
    disposing onto a substrate a xerogel-forming composition comprising a sol, a crosslinked polymer binder and a liquid medium; the crosslinked polymer binder having a glass transition temperature that is greater than or equal to about 50° C., the crosslinked polymer binder comprising a polymer and a crosslinking agent, wherein the polymer binder is water soluble prior to crosslinking;
    removing the liquid medium from the xerogel-forming composition to form a microporous xerogel comprising pores that are substantially continuously interconnected from a first outermost surface of the microporous xerogel through to a second outermost surface of the microporous xerogel;
    contacting a surface of the microporous xerogel with an organic electrolyte; and infusing the organic electrolyte into pores of the microporous layer;
    wherein the crosslinking agent comprises an aldehyde or thermosetting polymer and wherein the crosslinking agent in the polymer is present in an amount of about 40 to about 80 mole percent;
    wherein the crosslinked polymer binder is present in an amount of 5 to 70 wt. % by weight of the sol in the xerogel-forming composition;
    wherein the microporous xerogel comprises a pseudo-boehmite, zirconium oxide, titanium oxide, barium oxide, silicon oxide, aluminum oxide, tin oxide, or a combination comprising at least one of the foregoing oxides;
    wherein the polymer is a polyvinyl alcohol, a copolymer of a polyvinyl acetate and a polyvinyl pyrrolidone, a copolymer of polyvinyl alcohol and a polyvinyl pyrrolidone, or a combination comprising at least one of the foregoing polymers;

wherein the glass transition temperature of the polymer changes by less than about 25% after exposure to water and after exposure to an organic electrolyte; and wherein the microporous xerogel has a porosity of 40 to 80%.

13. The microporous layer of claim 12, wherein the organic electrolyte comprises an ionic electrolyte salt, to improve the ionic conductivity and other electrochemical properties of an electrolyte element, selected from the group consisting of a lithium polysulfide, a lithium salt of an organic ionic polysulfide, $MClO_4$, $MAsF_6$, $MSO_3CF_3$, $MSO_3CH_3$, $MBF_4$, $MB(Ph)_4$, $MPF_6$, MSCN, MIMBr,

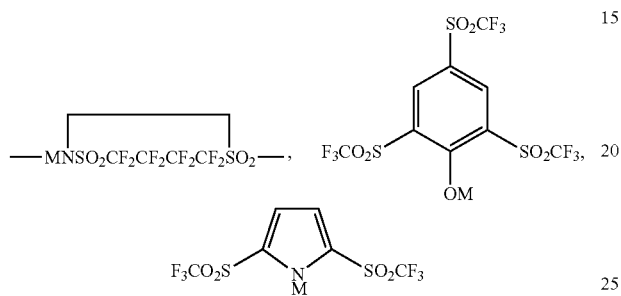

and combinations comprising at least one of the foregoing ionic electrolyte salts, where M is Li or Na.

14. A separator layer for an electrochemical cell made by a method of manufacture comprising:

disposing onto a substrate a xerogel-forming composition comprising a sol, a crosslinked polymer binder and a liquid medium; the crosslinked polymer binder having a glass transition temperature that is greater than or equal to about 50° C., the crosslinked polymer binder comprising a polymer and a crosslinking agent, wherein the polymer binder is water soluble prior to crosslinking;

removing the liquid medium from the xerogel-forming composition to form a microporous xerogel comprising pores that are substantially continuously interconnected from a first outermost surface of the microporous xerogel through to a second outermost surface of the microporous xerogel;

contacting a surface of the microporous xerogel with an organic electrolyte; and infusing the organic electrolyte into pores of the microporous layer;

wherein the crosslinking agent comprises an aldehyde or thermosetting polymer and wherein the crosslinking agent in the polymer is present in an amount of about 40 to about 80 mole percent;

wherein the crosslinked polymer binder is present in an amount of 5 to 70 wt. % by weight of the sol in the xerogel-forming composition;

wherein the microporous xerogel comprises a pseudo-boehmite, zirconium oxide, titanium oxide, barium oxide, silicon oxide, aluminum oxide, tin oxide, or a combination comprising at least one of the foregoing oxides;

wherein the polymer is a polyvinyl alcohol, a copolymer of a polyvinyl acetate and a polyvinyl pyrrolidone, a copolymer of polyvinyl alcohol and a polyvinyl pyrrolidone, or a combination comprising at least one of the foregoing polymers;

wherein the glass transition temperature of the polymer changes by less than about 25% after exposure to water and after exposure to an organic electrolyte; and wherein the microporous xerogel has a porosity of 40 to 80%.

\* \* \* \* \*